Oct. 19, 1943.    C. T. RASMUSSEN    2,332,012
PLANTER
Filed Nov. 13, 1941
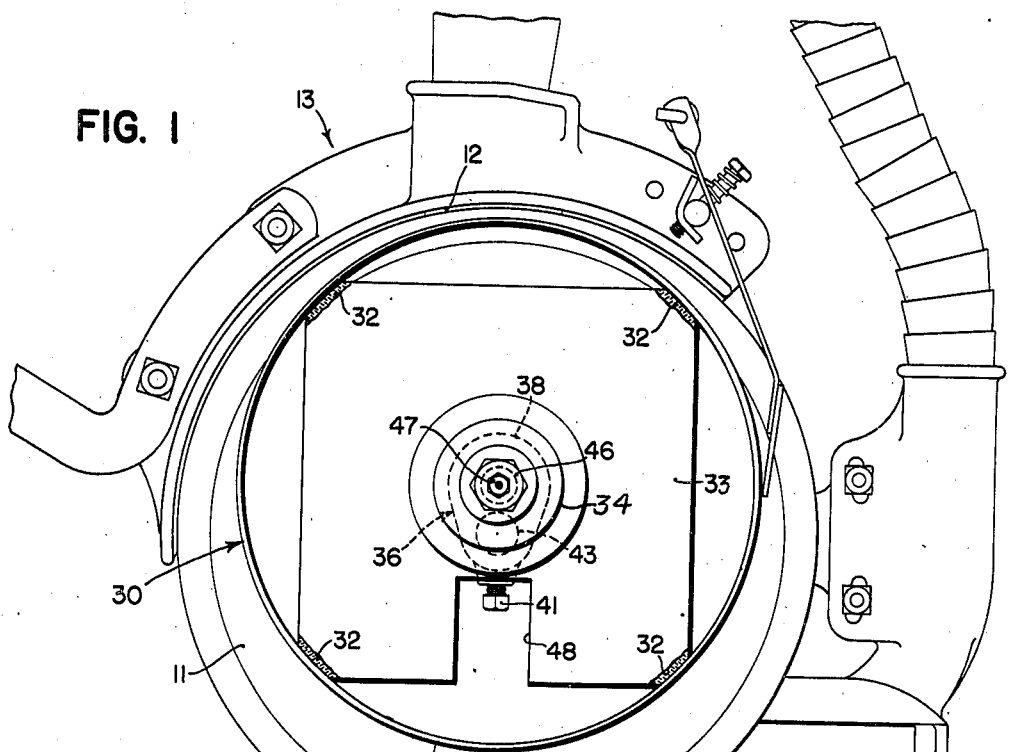
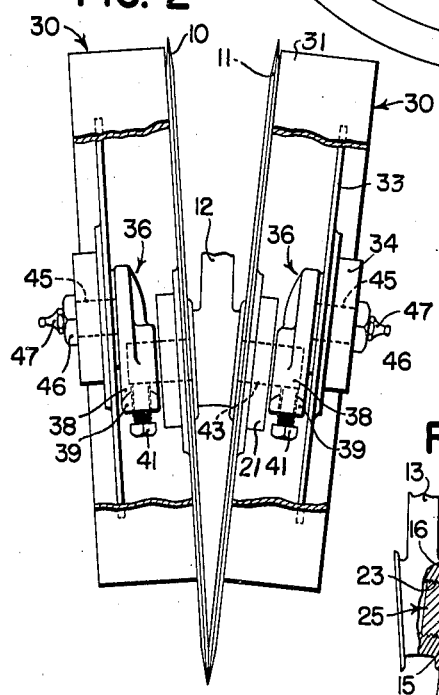
INVENTOR:
Clarence T. Rasmussen
BY
ATTORNEYS.

Patented Oct. 19, 1943

2,332,012

UNITED STATES PATENT OFFICE 2,332,012

PLANTER

Clarence T. Rasmussen, Moline, Ill., assignor to Deere & Company, Moline, Ill., a corporation of Illinois Application November 13, 1941, Serial No. 418,882

4 Claims. (Cl. 97—189)

The present invention relates generally to agricultural implements and more particularly to ground working implements of the disk type.

The object and general nature of the present invention is the provision of a new and improved depth gauging device for furrow opening disks, such as those used on planters, drills, and the like. Specifically, it is the feature of this invention to provide a rotatable depth gauging member which is eccentrically mounted with respect to the disk and adjustable about the axis of the latter whereby to change the position of the depth gauging member as desired. It is also a feature of this invention to provide a new and improved construction wherein a rotatable depth gauging member is mounted eccentrically by means of a part that is adjustably fixed to a stud or the like which forms a part of the supporting means on which the disk furrow opener is journaled for rotation.

These and other objects and advantages of the present invention will be apparent to those skilled in the art after a consideration of the following detailed description of the preferred embodiment, taken in conjunction with the accompanying drawings.

In the drawing:

Figure 1 is a side view of the double disk furrow opener of a beet and bean drill, in which an adjustable depth gauge constructed according to the principles of the present invention has been incorporated;

Figures 2 and 3 are front views, with portions of the depth band broken away, showing two different positions of adjustment, Figure 2 showing the arrangement of the parts for maximum depth and Figure 3 showing the position of the parts for minimum depth; and Figure 4 is a fragmentary front elevational view of the lower portion of the seed boot shank and one of the furrow opening disks, the latter being broken away to show the bearing means for rotatably supporting the disk.

The principles of the present invention have been illustrated in the drawing as embodied in a double disk furrow opener, such as may be used in a drill for planting beet, bean and other seeds. The two furrow opening disks are indicated by the reference numerals 10 and 11 and are mounted for rotation at the lower end of the shank 12 of a seed boot which is indicated in its entirety by the reference numeral 13 and which serves as the supporting means for the furrow opening disks 10 and 11. The disks 10 and 11 may be mounted for rotation in any suitable manner, and by way of illustration I have shown one of the disk bearings in Figure 4. Referring now to this figure, the disk 11 has a central aperture, as at 15, in which a projecting portion 16 of a bearing block 17 is disposed. The bearing block 17 is generally in the nature of a ring member and has a flange 18 overlying the apertured central portion of the disk 11 and disposed within a bearing cap or cup 21 riveted or otherwise secured to the disk 11 after the disk bearing 17 is is place therein. The lower portion of the shank 12 is provided with a pair of screw-threaded apertures 23, and into each is screwed a threaded member 25. The latter member has a head portion 26 which seats in a socket section 27 of the bearing ring 17, and the projecting or shoulder portion 16 of the bearing member 17 engages the side of the shank 12 with some clearance to permit the disk 11 to rotate freely. Thus, by screwing the member 25 into the shank 12, the bearing member 17 is fixed in a stationary manner to the supporting shank 12. The other disk 10 is mounted for rotation in substantially the same manner, and hence further description is unnecessary.

Each of the furrow opening disks 10 and 11 is provided with an adjustable depth band or gauge wheel indicated in its entirety by the reference numeral 30, and each of the adjustable depth gauging wheels 30 is mounted for rotation on an eccentric which is fixed adjustably to a part carried by the lower end of the shank 12. As best shown in Figures 1–3, each of the depth gauging members 30 comprises a circular band 31 welded, as at 32, to the corners of a square plate or web section 33, the central portion of which carries a bearing member 34 of any suitable construction. An eccentric or crank member 36 is provided for each of the depth gauging wheels 30, and each member 36 comprises a casting having a sleeve section 38 which carries a boss 39 that is tapped to receive a set screw 41. Each of the castings 36 is adapted to be fixed to a pin or stud 43 that is secured, as by welding or the like, to the associated screw-threaded member 25 (Figure 4) that forms a part of the bearing for the adjacent disk. Each member 36 carries a stud 45 that extends outwardly in eccentric relation with respect to the sleeve section 38, and the pin or stud 45 is formed to receive the bearing 34 of the associated depth wheel 39. A hollow nut member 46 serves to hold the depth wheel 30 in place, and the nut member 46 is provided with a lubricant fitting 47. The wheel plate 31 is provided with a portion cut away, as at 48 in Figure 1, to provide access to the set screw 41, as best shown in Figure 1.

The operation of the adjustable depth gauge described above is substantially as follows. As best shown in Figure 2, each of the disks 10 and 11 is provided with a depth gauging wheel 30 and each is mounted on an eccentric member 36. When it is desired to open a relatively deep furrow, the set screws 41 of the two depth gauging wheels 30 are loosened and the castings 36 swung upwardly to dispose the wheel-carrying studs 45 in an upward position, after which the set screws 41 are tightened so as to secure the members 36 firmly and rigidly to the shank 12, it being remembered that the pins or studs 43 are secured to or form a part of the bearing securing members 25 and hence are rigid with respect to the supporting shank 12. It will be noted from Figure 4 that the members 36 may be utilized for tightening the members 25. If a shallow furrow is desired, the castings 36 are swung in a direction to lower the wheel-carrying studs 45, Figure 3 showing these parts in a position corresponding to the most shallow furrow opening position, in which the pins 45 are in their lowermost position. By loosening the set screws 41 and moving the members to an intermediate position, intermediate furrow depths may be secured.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a support including a stub shaft, a disk furrow opener journaled on said shaft, a crank arm having a hub journaled on said shaft outwardly of said disk furrow opener, a stud mounted on said arm and offset from said stub shaft, a gauge band disposed in juxtaposition to said disk enclosing said arm, a hub on which said band is supported, said hub being journaled on said stud, and means for fixing said arm hub to said shaft in any angular position of the arm relative to the ground.

2. In an agricultural implement, a support including a stub shaft, a disk furrow opener journaled on said shaft, a crank arm having a hub journaled on said shaft outwardly of said disk furrow opener, an outwardly extending stud fixed to said arm in offset relation to said stub shaft, a hub journaled on said stud, a generally radially extending plate fixed to said hub and serving as a supporting web, a gauge band encircling said arm disposed in juxtaposition to said disk and fixed to said supporting plate, said plate and said band serving as an enclosure for said arm, and means for adjustably fixing said arm hub to said shaft in any angular position of said arm about the axis of said shaft.

3. In an agricultural implement, a support having a threaded socket, a stud threaded to engage said socket and having a circumferentially extending head portion, an annular bearing member engaged between said head portion and said support, a disk furrow opener journaled on said bearing member, a gauge wheel support having a hub journaled on the outer end of said stud, means for adjustably fixing said gauge wheel support on said stud in any angular position about the axis of the latter, and a gauge wheel journaled on said support for rotation about an axis disposed eccentric to the axis of rotation of said disk furrow opener.

4. In an agricultural implement, a support having a threaded socket, a stud threaded to engage said socket and having a circumferentially extending head portion, an annular bearing member engaged between said head portion and said support, a disk furrow opener journaled on said bearing member, a gauge wheel support having a hub journaled on the outer end of said stud, means for adjustably fixing said gauge wheel support on said stud in any angular position about the axis of the latter, and a gauge wheel journaled on said support for rotation about an axis disposed eccentric to the axis of rotation of said disk furrow opener, said gauge wheel comprising a supporting hub and a band mounted thereon and disposed radially outwardly of said gauge wheel support, encircling the latter and in juxtaposition to said disk furrow opener to prevent trash from winding upon or fouling said stud and said gauge wheel support.

CLARENCE T. RASMUSSEN.